US011184556B2

(12) United States Patent
Soderholm et al.

(10) Patent No.: US 11,184,556 B2
(45) Date of Patent: Nov. 23, 2021

(54) CAMERA VISION SYSTEM OVERLAP MANAGEMENT WITHOUT NETWORK COORDINATION

(71) Applicant: SIGNIFY HOLDING B.V., Eindhoven (NL)

(72) Inventors: Brian J. Soderholm, Peachtree City, GA (US); Jonathan A. Whitten, Fishers, IN (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/670,641

(22) Filed: Oct. 31, 2019

(65) Prior Publication Data

US 2020/0137315 A1 Apr. 30, 2020

Related U.S. Application Data

(60) Provisional application No. 62/753,778, filed on Oct. 31, 2018.

(51) Int. Cl.
| | |
|---|---|
| *H04N 9/47* | (2006.01) |
| *H04N 5/247* | (2006.01) |
| *H04N 5/232* | (2006.01) |
| *H04N 7/18* | (2006.01) |
| *H04N 5/225* | (2006.01) |
| *G06K 9/46* | (2006.01) |

(52) U.S. Cl.
CPC ........... *H04N 5/247* (2013.01); *G06K 9/4638* (2013.01); *H04N 5/2256* (2013.01); *H04N 5/23229* (2013.01); *H04N 7/181* (2013.01)

(58) Field of Classification Search
CPC .......... G06K 9/00771; G08B 13/19641; G06T 2207/30242
See application file for complete search history.

(56) References Cited

U.S. PATENT DOCUMENTS

| 10,289,917 | B1* | 5/2019 | Fu ...................... G06K 9/00335 |
|---|---|---|---|
| 2008/0273754 | A1 | 11/2008 | Hick et al. |
| 2017/0148175 | A1* | 5/2017 | Liu ........................... G06T 7/11 |
| 2017/0185828 | A1* | 6/2017 | Yamamoto ............... G06K 9/46 |
| 2018/0014382 | A1* | 1/2018 | Glaser ................ G06K 9/00624 |
| 2018/0167547 | A1* | 6/2018 | Casey .................. H05B 47/115 |
| 2019/0220678 | A1* | 7/2019 | Guo ..................... G06K 9/6218 |
| 2019/0287229 | A1 | 9/2019 | Wang et al. |
| 2019/0306408 | A1* | 10/2019 | Hofer ..................... H04N 5/247 |

* cited by examiner

*Primary Examiner* — Fabio S Lima (57) ABSTRACT

A system of cameras includes a first camera and a second camera. The first camera captures a first image with a first total number of objects and a first total number of edge objects. The second camera captures a second image with a second total number of objects and a second total number of edge objects. A controller determines the total number of objects by summing the first total number of objects and the second total number of objects and subtracting the first total number of edge objects. In another implementation, the first camera and the second camera can have a coordinate system used to assign coordinates to objects identified in a first image from the first camera and a second image from the second camera. A controller can compare the coordinates of the objects to identify duplicates to determine an accurate total number of objects.

8 Claims, 7 Drawing Sheets

CAMERA VISION SYSTEM OVERLAP MANAGEMENT WITHOUT NETWORK COORDINATION

RELATED APPLICATIONS

The present application claims priority to U.S. Provisional Patent Application No. 62/753,778 filed Oct. 31, 2018 and titled "Camera Vision System Overlap Stitching Without Network Coordination," the entire contents of which are incorporated herein by reference.

TECHNICAL FIELD

Embodiments described herein relate generally to a network of cameras.

BACKGROUND

The use of cameras is becoming more prevalent for a variety of reasons, including tracking of items and people, monitoring of areas, and providing security. Luminaires and other electrical devices provide a unique opportunity for integrating cameras, however, improvements are needed in the manner in which a network of cameras are commissioned and operate together.

SUMMARY

In one example embodiment, the present disclosure is directed to a system comprising a first electrical device with a first camera and a first processor, wherein the first camera captures a first image of a first portion of the volume of space and wherein the first processor identifies a first total number of objects in the first image and identifies a first total number of edge objects in the image. The system also comprises a second electrical device with a second camera and a second processor, wherein the second camera captures a second image of a second portion of the volume of space and wherein the second processor identifies a second total number of objects in the second image and a second edge object in the image. A controller receives the first total number of objects and the first total number of edge objects from the first electrical device and receives the second total number of objects and the second total number of edge objects from the second electrical device. The controller can determine a total number of the objects in the volume of space by summing the first total number of objects and the second total number of objects and subtracting the first total number of edge objects.

In another example embodiment, the present disclosure is directed to a system comprising a first electrical device with a first camera and a first processor, the first camera having a coordinate system, wherein the first camera captures a first image of a first portion of the volume of space and wherein the first processor identifies a first plurality of objects in the first image and assigns coordinates to each of the first plurality of objects. The system also comprises a second electrical device comprising a second camera and a second processor, the second camera having the coordinate system, wherein the second camera captures a second image of a second portion of the volume of space and wherein the second processor identifies a second plurality of objects in the second image and assigns coordinates to each of the second plurality of objects. A controller receives the coordinates of the first plurality of objects from the first electrical device, receives the coordinates of the second plurality of objects from the second electrical device, compares the coordinates of the first plurality of objects to the coordinates of the second plurality of objects to identify one or more duplicates, and determines a total number of objects by summing the first plurality of objects with the second plurality objects and subtracting the one or more duplicates.

In yet another example embodiment, the present disclosure is directed to a system comprising a controller communicably coupled to a first electrical device and a second electrical device, wherein the controller transmits a macro-coordinate system to the first electrical device and the second electrical device. The first electrical device can include a first camera and a first processor, wherein the first camera captures a first image of a first portion of the volume of space and wherein the first processor identifies a first plurality of objects in the first image and assigns coordinates to each of the first plurality of objects based on the macro-coordinate system. The second electrical device can include a second camera and a second processor, wherein the second camera captures a second image of a second portion of the volume of space and wherein the second processor identifies a second plurality of objects in the second image and assigns coordinates to each of the second plurality of objects based on the macro-coordinate system. The controller can receive the coordinates of the first plurality of objects from the first electrical device, receive the coordinates of the second plurality of objects from the second electrical device, compare the coordinates of the first plurality of objects to the coordinates of the second plurality of objects to identify one or more duplicates, and determine a total number of objects by summing the first plurality of objects with the second plurality of objects and subtracting the one or more duplicates.

The foregoing embodiments are non-limiting examples. These and other aspects, objects, features, and embodiments will be apparent from the following description and the appended claims.

BRIEF DESCRIPTION OF THE DRAWINGS

The drawings illustrate only example embodiments of camera systems and are therefore not to be considered limiting of the scope of this disclosure. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The example embodiments discussed herein are directed to systems, apparatuses, and methods relating to commissioning cameras and using systems of cameras. The cameras described herein can be installed in a luminaire or other device, but can also be stand-alone cameras that are not installed in another device. The example cameras described herein may be installed in a variety of indoor and outdoor locations, including in homes, offices, schools, garages, stadiums, warehouses, and a variety of other buildings and environments. The systems illustrated herein include two or more cameras with overlapping fields of vision. The visual field for a camera is the broadest possible range for which the camera can record an image. However, it may be desirable to narrow the range in which the camera records images to a field of interest defined by a boundary. The field of interest can be set in connection with commissioning the camera. A field of interest can be set so that the camera only monitors items or people in a designated area. Additionally, a field of interest can be set for the camera so that the area monitored by the camera does not overlap with another area monitored by another camera.

As used herein, the term "frame stitching" (also called "stitching") refers to the process of taking images of portions of a volume of space (e.g., the field of interest), captured by multiple cameras, and piecing those images together to create a single overall image of the volume of space. Piecing together the various images can involve adjacent images that overlap each other and/or adjacent images that do not overlap each other. Also, piecing together the various images can involve manipulating (e.g., cropping, zooming out, zooming in) one or more of those images to create the single overall image of the volume of space. The images that are used in frame stitching can be still images, segments of video, or some combination thereof.

The process of frame stitching can be complicated along the boundaries of the field of interest or image. For example, if the system of cameras is monitoring or tracking moving objects or people, frame stitching must be performed so that objects or people along the boundaries of two images are not counted twice ("double counting"). One approach to avoiding the double-counting problem is to gather images from adjacent cameras and transmit the images via a network to a remote processor configured to resolve the double-counting of objects or people in the images. However, transmitting images from the cameras via a network to a remote processor may be undesirable for privacy, security, or network bandwidth reasons. For example, transmitting images of people can include personally identifiable information, such as an image of a person's face, that an operator of the camera system may not want to transmit. As another example, transmitting many images over a network that is in communication with the cameras can undesirably consume significant bandwidth of the network. Accordingly, systems and methods for resolving the double-counting problem without the transmission of images over a communication network can offer advantages.

The present disclosure provides alternative solutions that resolve the double-counting problem without the need to transmit images of the volume of space being monitored. In other words, the present disclosure describes camera systems where the double-counting problem is resolved based on information such as the number of objects/people in a volume of space, the positions of the objects/people in the volume of space, or coordinate systems associated with each camera and without transmitting images of the volume of space.

Figure 1:
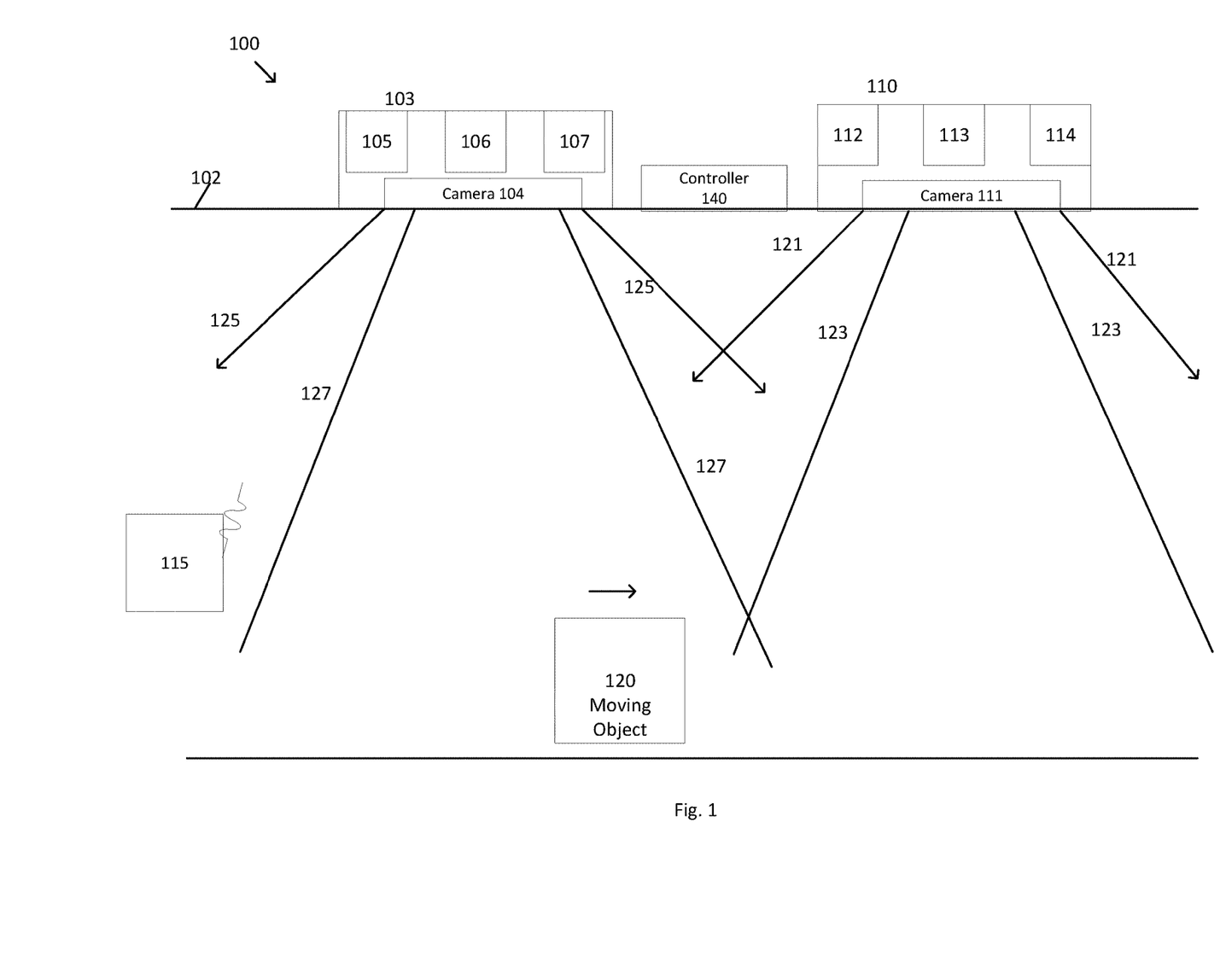
FIG. 1 is a schematic view of a system of cameras installed in a ceiling in accordance with an example embodiment.

Referring to FIG. 1, an example camera system 100 installed in a room is illustrated. The camera system 100 comprises first electrical device 103 having a first camera 104 and second electrical device 110 having a second camera 111. The first electrical device 103 and the second electrical device 110 can be luminaires installed in a ceiling 102 of the room. Alternatively, the electrical devices can be any of a variety of other electrical devices in which a camera is installed such as a speaker, a smoke detector, or another type of sensor. In yet other embodiments, the electrical device may only comprise the stand-alone camera and its associated components and may not serve other sensing or illumination functions. As further illustrated in FIG. 1, camera 104 has an associated transceiver 105, an associated processor 106, and an associated memory 107. Similarly, camera 111 has an associated transceiver 112, an associated processor 113, and an associated memory 114. Image processing software can be stored in memory 107, 114 and executed by processors 106, 113 in order to gather information or perform other analysis or operations with respect to images or videos captured by cameras 104, 111.

The components associated with first camera 104 and second camera 111 can be installed in a variety of positions within or on the electrical device. A power source supplies power (e.g. 120V AC, 220V AC, 24V DC, 48V DC) to first electrical device 103 and second electrical device 110. In the example of FIG. 1, the first camera 104 and second camera 111 are oriented to record images of an area within the room. The first transceiver 105 and second transceiver 112 enable wireless communication between a commissioning device 115 and the first and second electrical devices 103 and 110. The commissioning device can be a smart phone or another device capable of communicating with the transceivers 105 and 112. The commissioning device 115 can communicate with the transceivers 105 and 112 using any of a variety of communication methods including visible light, infrared light, and radio frequency waves. In one alternate embodiment, the transceivers 105 and 112 can be eliminated and a commissioning signal can be provided with visible or infrared light transmissions that can be detected by the cameras 104 and 111. In another alternate embodiment, the transceiver 107 can be eliminated and a user can interact with the camera 105 to provide a commissioning signal via a user interface such as a touch screen or a button located on the camera.

FIG. 1 also illustrates a controller 140. The controller can comprise a processor, memory, and a communication means (e.g. a transceiver) for communicating with the first electrical device 103 and the second electrical device 110. As described further below, the controller 140 can receive from each electrical device an associated coordinate system, directional information, and information relating to a count of people or objects within an image captured by the camera of the electrical device.

FIG. 1 further illustrates visual fields and areas of interest associated with each camera. For example, first camera 104 can have a visual field defined by lines 125 and a smaller area of interest defined by lines 127. Similarly, second camera 111 can have a visual field defined by lines 121 and a smaller area of interest defined by lines 123. The visual field indicated by lines 125 and 121 is the broadest possible range for which the first camera 104 and the second camera 111 can record an image. While it is not required that the cameras have an area of interest, defining an area of interest smaller than the visual field of the camera can reduce the overlap in the images recorded by first camera 104 and second camera 111.

FIG. 1 also illustrates a moving object 120. The moving object 120 can represent a person, an animal, or an inanimate object. The present disclosure addresses the problem of double counting a stationary object or a moving object, such as moving object 120, that is near the boundary between the first camera 104 and the second camera 111.

In one example, a coordinate system can be associated with each camera illustrated in FIG. 1 through the use of tokens or gestures. A token can be a piece of paper or other object that is recognizable in an image recorded by the camera. In one example, the token can be placed in the field of interest of the camera and the camera, triggered by a commissioning signal, can take an image of the token. A technician can then move the token to a second position and the camera can take a second image of the token in the second position. The movement of the token can define a desired coordinate system direction for the camera. A processor associated with the camera can execute software code stored in memory that creates, for the camera, a localized vector direction associated with the movement of the token. The technician can move the token again in a direction perpendicular to the first direction and another vector orthogonal to the localized vector can define an X-Y coordinate system associated with the camera. If a three-dimensional coordinate system is desired, the technician can move the token again in the third dimension so that the software executed by the processor can define a third dimension of the coordinate system. As an alternative to the movement of the token, a person can use gestures to define a coordinate system for the camera.

When the initial position of the token or gesture (the origin) and the desired coordinate system direction are provided to the camera, software code executed by the camera's processor can create a transformation matrix to normalize the positions of the tokens or gestures in the volume of space. The camera can share the localized vector representing a particular direction of movement and the X-Y coordinate system with a second camera via a communication link between the cameras, such as that provided by the controller 140. The shared coordinate system between the two cameras allows coordinate points gathered from the two cameras to be compared. However, a shared coordinate system between two adjacent cameras is not required for all of the example embodiments described herein.

Figure 2A:
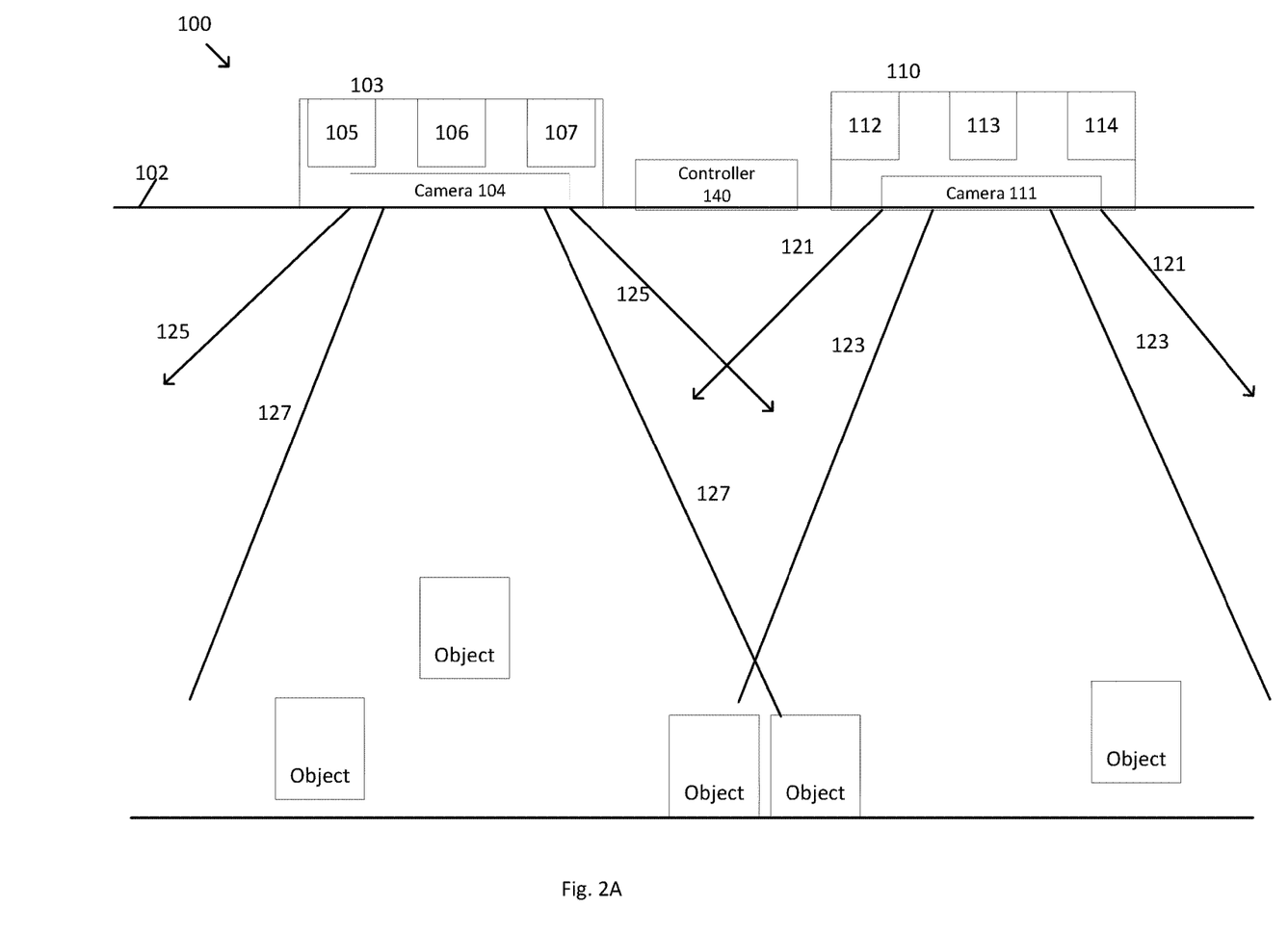
FIG. 2A is a schematic view of a first method for operating the system of cameras of FIG. 1 in accordance with an example embodiment.
Figure 2B:
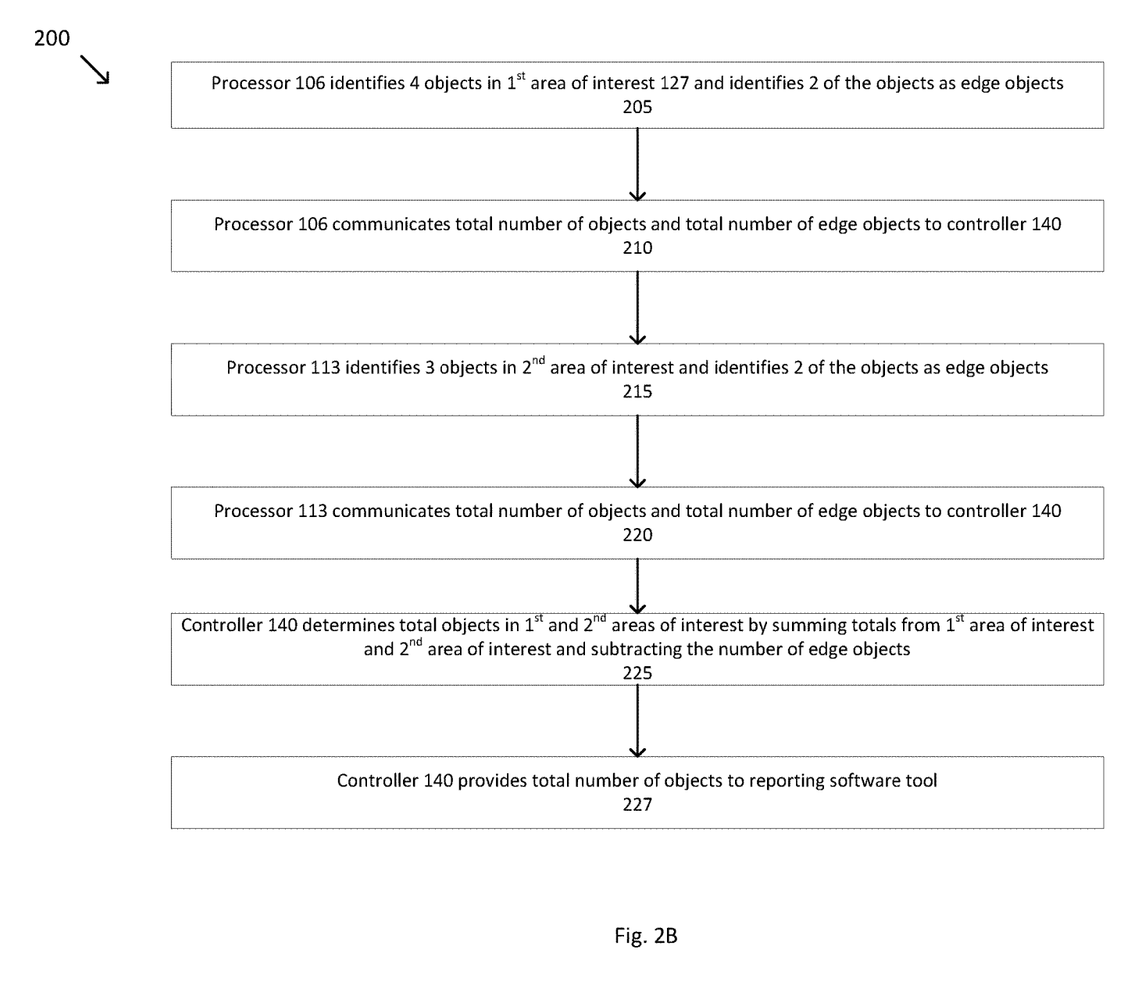
FIG. 2B is a flow chart describing the method of FIG. 2A in accordance with an example embodiment.

In one example approach addressing the double-counting problem described above, software code executed by the camera's processor can classify an object (e.g., a person, animal, or an inanimate object) at the edge of an image boundary as an "edge object (x,y)". If the first camera 104 and the second camera 111 share a boundary, the software code executed by each camera's associated processor can provide a total object count for each camera to the controller 140. The controller 140 can reduce the total person count by the number of people falling in the intersection of the fields of interest of the first camera and the second camera. FIGS. 2A and 2B illustrate this approach in greater detail.

For example, FIG. 2A illustrates the camera system 100 previously described in connection with FIG. 1. However, camera system 100 illustrated in FIG. 2A has multiple objects located at varying positions within the areas of interest of camera 104 and camera 111. FIG. 2B provides an example method for avoiding double counting of objects as illustrated in camera system 100 of FIG. 2A. As illustrated in FIG. 2A, first area of interest 127 associated with first camera 104 may contain a total of four objects (including objects at the edge of the area of interest) and second area of interest 123 associated with second camera 111 may contain a total of three objects (including objects at the edge of the area of interest). However, two of the objects may be classified as "edge objects" in that two of the objects are located along the intersecting boundary and within both the first area of interest 127 and the second area of interest 123.

According to the example method of FIG. 2A, in step 205, processor 106 receives one or more images from camera 104 and identifies four total objects, two of which are edge objects, in the area of interest 127. In step 210, the processor 106 can communicate, via transceiver 105 and a wired or wireless connection, the total number of objects and the total number of edge objects from area of interest 127 to the controller 140. In step 215, processor 113 receives one or more images from camera 111 and identifies three total objects, two of which are edge objects, in the area of interest 123. In step 220, the processor 113 can communicate, via transceiver 112 and a wired or wireless connection, the total number of objects and the total number of edge objects from the area of interest 123 to the controller 140. In step 225, the controller 140 can sum the four objects of the first area of interest 127 and the three objects of the second area of interest 123 and subtract the two edge objects to determine an accurate total count of five objects for the combination of the first area of interest 127 and the second area of interest 123. In step 227, the controller 140 can provide the total count of five objects to a reporting software tool that tracks the total number of objects in an area monitored by the camera system 100. A similar method can be repeated for other adjacent cameras in the camera system 100.

Accordingly, double-counting can be avoided without the need to share or transmit images of the objects in each area of interest. Additionally, in this example, the double-counting problem is resolved without requiring that the adjacent cameras 104 and 111 share a coordinate system. When the controller 140 provides the total object count to the software reporting tool, the total can be used for a variety of valuable purposes. For example, the total object count can be used for security purposes, or to track items in a warehouse, or to count the number of customers at a business.

Figure 3A:
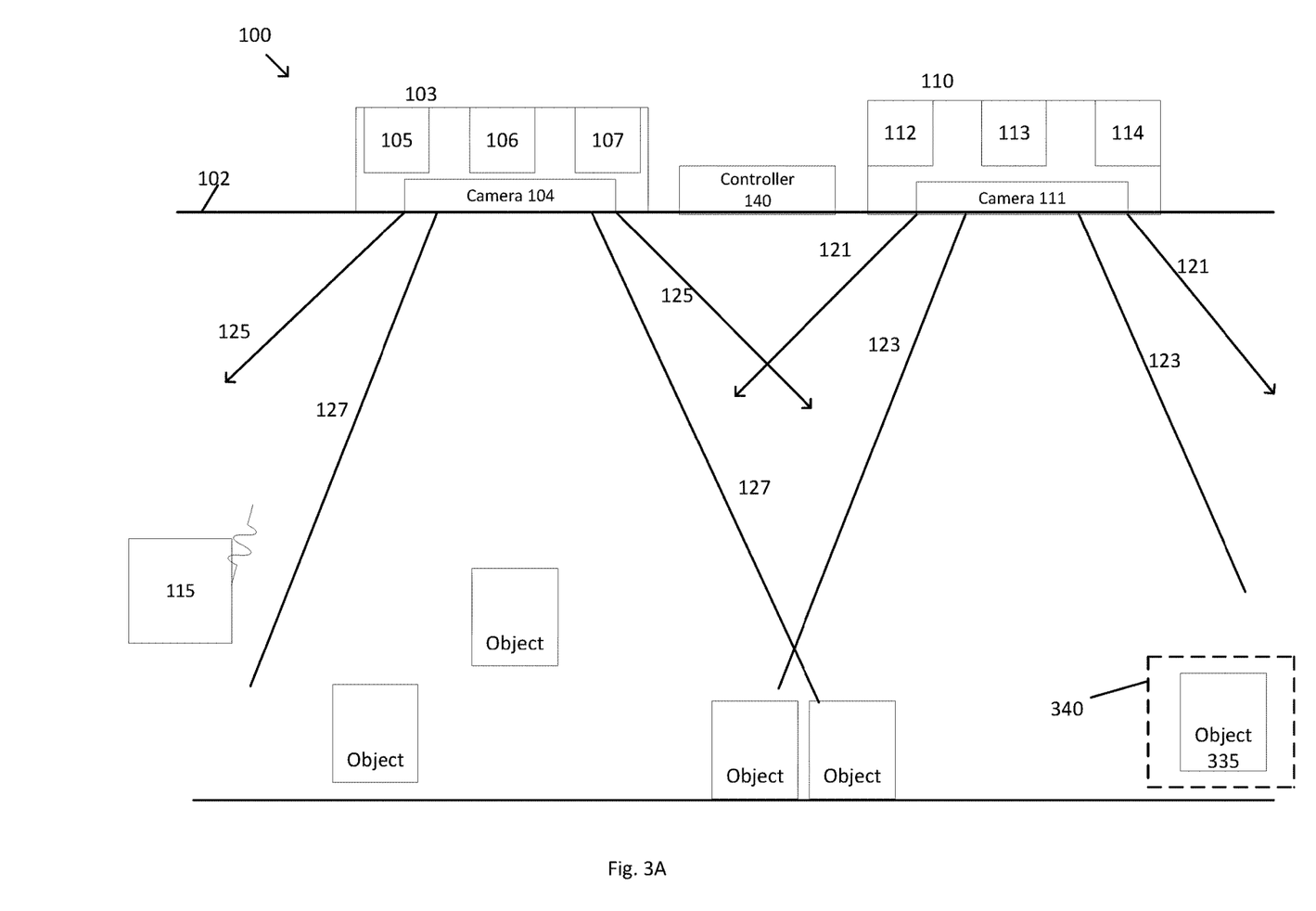
FIG. 3A is a schematic view of a second method for operating the system of cameras of FIG. 1 in accordance with an example embodiment.
Figure 3B:
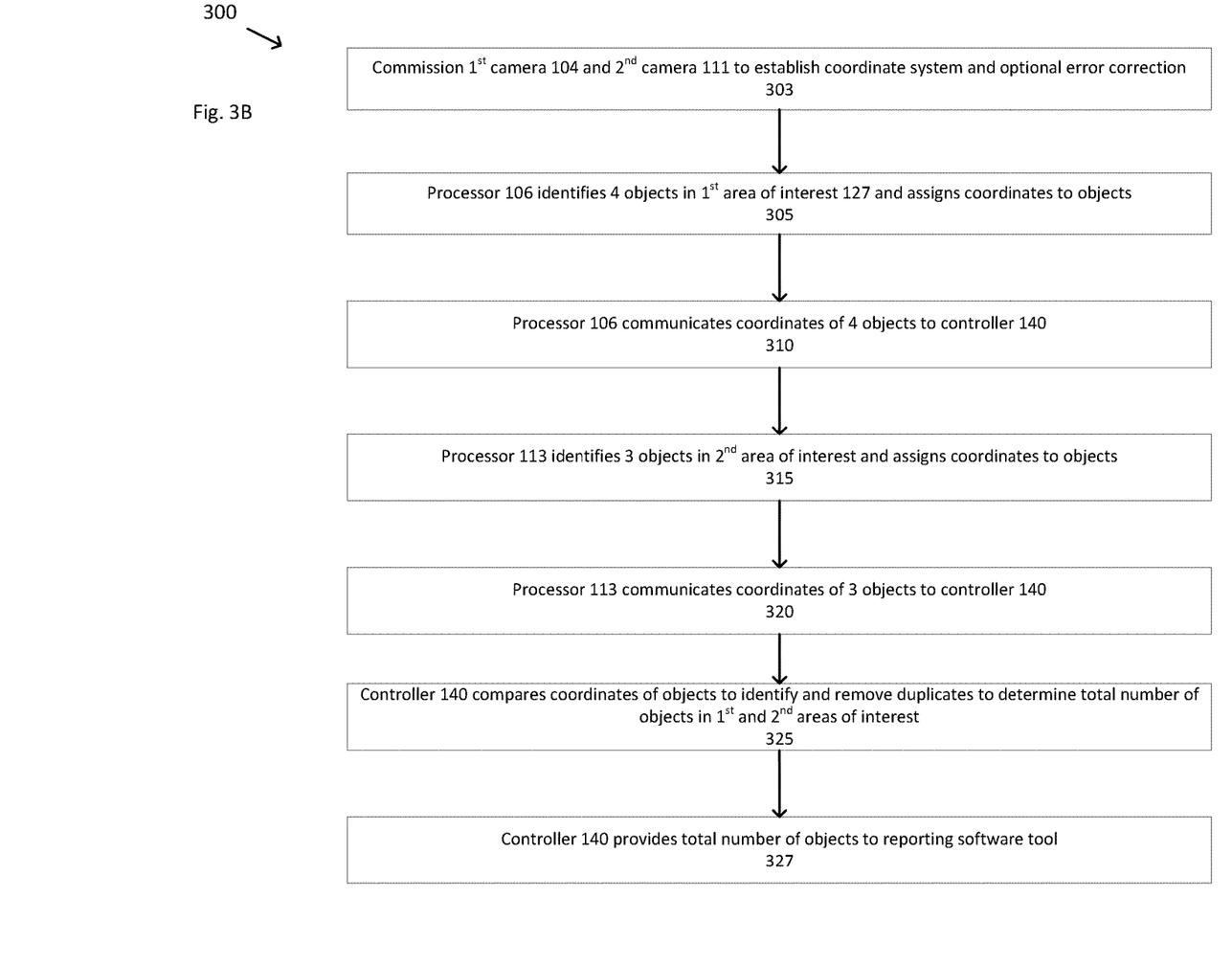
FIG. 3B is a flow chart describing the method of FIG. 3A in accordance with an example embodiment.

An alternative method to resolving double counting is illustrated in connection with FIGS. 3A and 3B. FIG. 3A illustrates the camera system 100 previously described in connection with FIG. 1. However, camera system 100 illustrated in FIG. 3A has multiple objects located at varying positions within the areas of interest of camera 104 and camera 111. FIG. 3B provides an example method for avoiding double counting of objects as illustrated in camera system 100 of FIG. 3A. As illustrated in FIG. 3A, first area of interest 127 associated with first camera 104 may contain a total of four objects (including objects at the edge of the area of interest) and second area of interest 123 associated with second camera 111 may contain a total of three objects (including objects at the edge of the area of interest). Two of the objects can be classified as "edge objects" in that two of the objects are located along the intersecting boundary and within both the first area of interest 127 and the second area of interest 123.

According to the example method of FIG. 3A, in step 303, camera 104 and camera 111 can be commissioned such that their settings are configured for normal or long term operation. As part of the commissioning step, as described previously in connection with FIG. 1, a coordinate system can be established for camera 104 with hand gestures or by moving a token within the visual field of camera 104. The coordinate system established for camera 104 can then be shared with camera 111 so that the two cameras have the same coordinate system. The coordinate system can be shared from camera 104 to camera 111 in a variety of ways. As one example, the coordinate system can be communicated from camera 104 to camera 111 via controller 140. Alternatively, the coordinate system can be shared between camera 104 and camera 111 by moving the token or making the hand gestures in the area where the visual fields of the two cameras overlap. As yet another option for sharing the coordinate system, the token movements or hand gestures can be performed in the visual field 125 of camera 104 and then can be repeated in the visual field 121 of camera 111 so that each camera establishes a coordinate system with the same orientation.

FIGS. 3A and 3B also illustrate an optional error correction step that can be performed in connection with the commissioning step. Errors can arise due to distortions in the camera lens or due to different types of lenses, such as "fish eye" lenses, being used in the camera. Errors can also arise when there are obstructions, such as a support, in the visual field of the camera. Errors can be exacerbated for objects located at the edges of the visual field of the camera because objects in images can appear distorted, compressed, or not as clear at these wide angles. The distortions and lack of clarity for objects in the images can affect the perceived dimensions or position of the object. Accordingly, these errors can be corrected during the commissioning process by moving a token of known dimensions to various places within the visual field of the camera. Because the token has known dimensions, an error correction software module stored in memory and executed by the processor associated with the camera can measure the amount of distortion that occurs when the token of known dimensions is moved to different areas within the visual field of the camera. The error correction software module can then set an error correction to be applied to images containing objects in areas within the visual field that produce distortion or lack of clarity. As illustrated in FIG. 3A, object 335 is located toward the edge of visual field 121 of camera 111. If during the commissioning process it is determined that objects at the location of object 335 appear distorted, the error correction software module can apply an error correction to images recorded by the camera 111 where the error correction alters the height or width of the object to a corrected size 340. With the error correction applied, the size or the coordinates of the object 335 can be more accurately determined. It should be understood that the foregoing optional error correction technique can be applied to any of the example embodiments described herein.

Referring now to step 305 of example method 300, processor 106 receives one or more images from camera 104 and identifies four total objects, two of which are edge objects, in the area of interest 127 and assigns coordinates to each object based on the location of the object and the previously established coordinate system. In step 310, the processor 106 can communicate to the controller 140, via transceiver 105 and a wired or wireless connection, the coordinates of the objects identified in the area of interest 127. In step 315, processor 113 receives one or more images from camera 111 and identifies three total objects, two of which are edge objects, in the area of interest 123 and assigns coordinates to each object based on the location of the object and the previously established coordinate system. In step 320, the processor 113 can communicate to the controller 140, via transceiver 112 and a wired or wireless connection, the coordinates of the objects identified in the area of interest 123 to the controller 140. In step 325, the controller 140 can compare the coordinates of the four objects of the first area of interest 127 with the coordinates of the three objects of the second area of interest 123. The controller 140 can identify duplicate objects, such as those in the area where the fields of interest overlap, because they will have matching coordinates. The controller 140 can subtract the duplicate edge objects to determine an accurate total count of five objects for the combination of the first area of interest 127 and the second area of interest 123. In step 327, the controller 140 can provide the total count of five objects to a reporting software tool that tracks the total number of objects in an area monitored by the camera system 100. A similar method can be repeated for other adjacent cameras in the camera system 100. Accordingly, double-counting can be avoided without the need to share or transmit images of the objects in each area of interest.

Figure 4A:
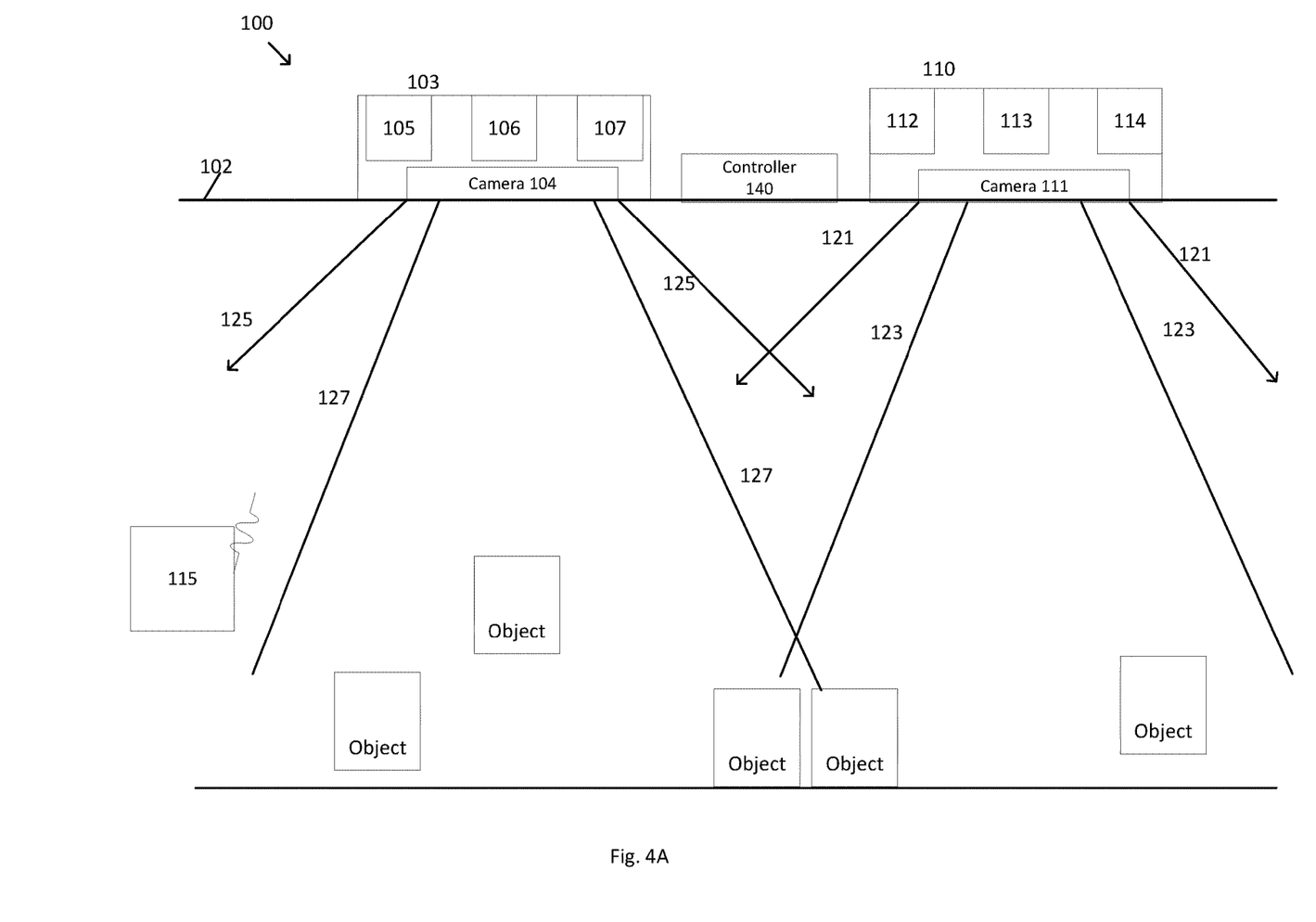
FIG. 4A is a schematic view of a third method for operating the system of cameras of FIG. 1 in accordance with an example embodiment.
Figure 4B:
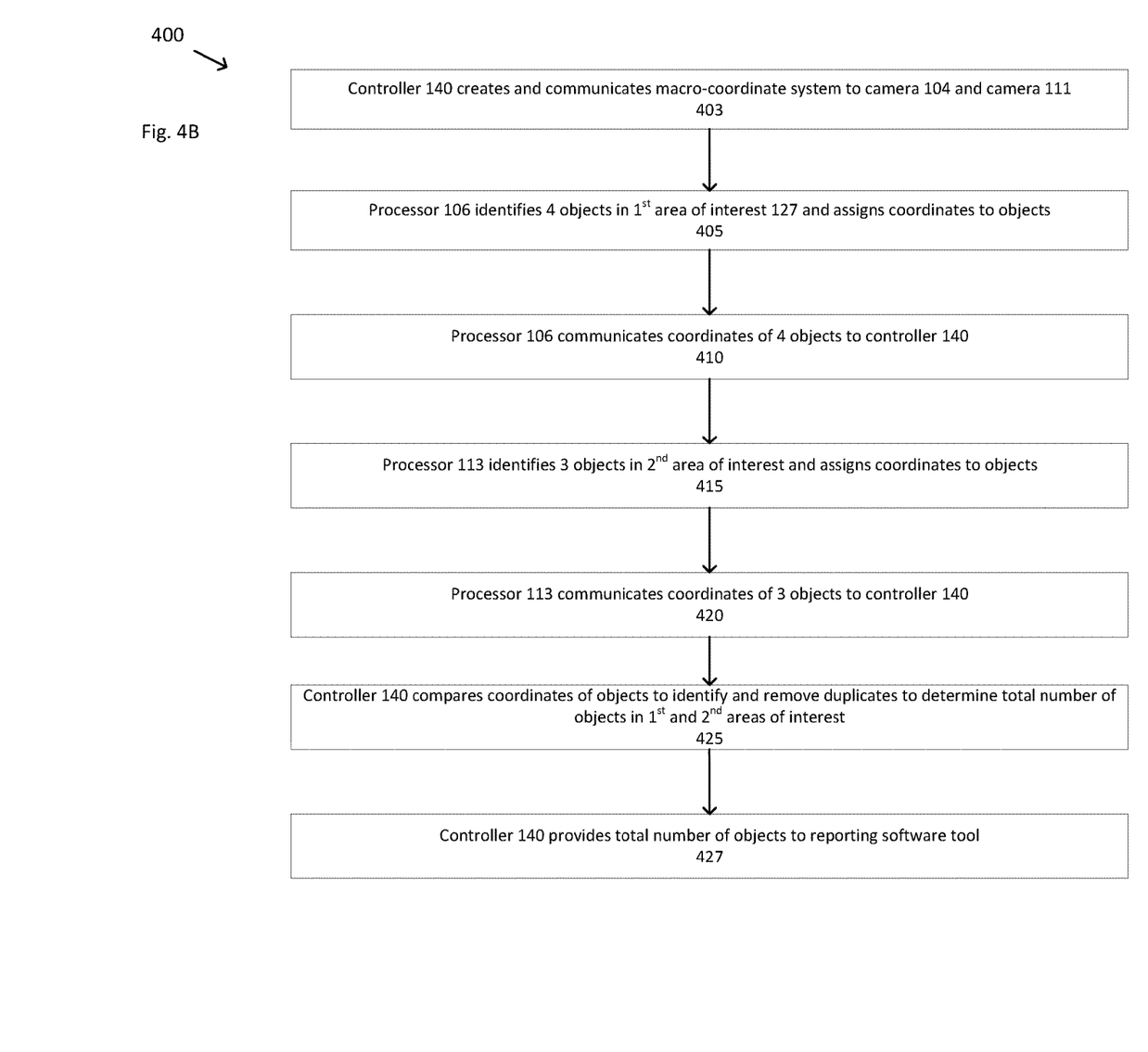
FIG. 4B is a flow chart describing the method of FIG. 4A in accordance with an example embodiment.

Yet another alternative method for resolving the double counting problem is illustrated in connection with FIGS. 4A and 4B. The method illustrated in FIGS. 4A and 4B can be used if the controller 140 has a map identifying the positions of the cameras in the camera system 100. During the commissioning process, with the existing map, the controller 140 can create a macro-coordinate system for the system of cameras as opposed to relying on the individual coordinate systems associated with each camera as described previously. As illustrated in the example method 400 of FIG. 4B, in step 403, the controller 140 can communicate the macro-coordinate system to the first camera 104 and the second camera 111. The processor 106, 113 and the image processing software stored in memory 107, 114 can use the macro-coordinate system to identify objects in the images recorded by the cameras 104, 111 and assign coordinates to those objects.

In step 405 of example method 400, processor 106 receives one or more images from camera 104 and identifies four total objects, two of which are edge objects, in the area of interest 127 and assigns coordinates to each object based on the location of the object and the previously established macro-coordinate system. In step 410, the processor 106 can communicate to the controller 140, via transceiver 105 and a wired or wireless connection, the coordinates of the objects identified in the area of interest 127. In step 415, processor 113 receives one or more images from camera 111 and identifies three total objects, two of which are edge objects, in the area of interest 123 and assigns coordinates to each object based on the location of the object and the previously established macro-coordinate system. In step 420, the processor 113 can communicate to the controller 140, via transceiver 112 and a wired or wireless connection, the coordinates of the objects identified in the area of interest 123 to the controller 140. In step 425, the controller 140 can compare the coordinates of the four objects of the first area of interest 127 with the coordinates of the three objects of the second area of interest 123. The controller 140 can identify duplicate objects, such as those in the area where the fields of interest overlap, because they will have matching coordinates. The controller 140 can subtract the duplicate edge objects to determine an accurate total count of five objects for the combination of the first area of interest 127 and the second area of interest 123. In step 427, the controller 140 can provide the total count of five objects to a reporting software tool that tracks the total number of objects in an area monitored by the camera system 100. A similar method can be repeated for other adjacent cameras in the camera system 100. Accordingly, double-counting can be avoided without the need to share or transmit images of the objects in each area of interest.

An optional step can be associated with steps 405 and 415 of example method 400. In particular, to the extent the macro-coordinate system does not provide sufficient accuracy for locating the objects identified in the respective fields of interest of camera 104 and camera 111, the processor 106, 113 associated with each camera can also transform the macro-coordinate position for an object to a first coordinate position based on a local coordinate system associated with each camera. The local coordinate system associated with the camera may be more accurate than the macro-coordinate system, which can be useful for more accurate position determination and double-counting elimination. Each camera 104, 111 can transmit to the controller 140, via transceivers 105, 112 the local coordinate positions of objects along with a transform showing the relation between the macro-coordinate system and the local coordinate system and the controller 140 can use this information for further position determination and double-counting elimination.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

Similarly, the example methods and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope of the disclosure. Accordingly, such alternative embodiments are included in the disclosure described herein.

As explained previously, the example embodiments can include one or more computer programs or sets of computer-executable instructions that embody the functions described herein and illustrated in the appended flow charts. The computer programs or instructions can be stored in memory and executed by the processor that is a part of the camera system. However, it should be apparent that there could be many different ways of implementing aspects of the example embodiments in computer programming, and these aspects should not be construed as limited to one set of computer instructions. Further, a skilled programmer would be able to write such computer programs to implement example embodiments based on the flow charts and associated description in the application text. Therefore, disclosure of a particular set of program code instructions is not considered necessary for an adequate understanding of how to make and use the example embodiments. Further, those skilled in the art will appreciate that one or more acts described may be performed by hardware, software, or a combination thereof, as may be embodied in one or more computing systems.

The example embodiments described herein can be used with computer hardware and software that perform the methods and processing functions described previously. The systems, methods, and procedures described herein can be embodied in a programmable controller, computer-executable software, or digital circuitry. The software can be stored on tangible non-transitory computer-readable media. For example, computer-readable media can include ROM, a hard disk, removable media, flash memory, a memory stick, optical media, magneto-optical media, CD-ROM, etc. Digital circuitry can include integrated circuits, gate arrays, building block logic, field programmable gate arrays (FPGA), etc.

The cameras described herein can record images and/or video for monitoring of a site, but it should be understood that the cameras can also serve a variety of functions. As non-limiting examples, the cameras can support functions such as occupancy/vacancy detection for light level adjustments or other environmental controls, daylight detection for light level adjustments, natural versus artificial light comparison for real-time light level tuning, counting the number of people, vehicles, or animals that pass by the camera, following people's directional movements for automatic light level control, sensing intelligent visible light communication from user devices for programming and user controls, facial recognition for identifying individuals, and intelligent gesture control.

Example embodiments provide a number of benefits. Examples of such benefits can include, but are not limited to, more efficient installation, configuration, control, replacement, modification, and maintenance of a camera or system of cameras; improved operational efficiency; compliance with one or more applicable standards and/or regulations; lower maintenance costs, increased flexibility in system design and implementation; and reduced cost of labor, installation and maintenance. Example embodiments can be used for installations of new luminaires, retrofitting existing luminaires, or installation of cameras without luminaires.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system disposed in a volume of space, the system comprising:
   a first electrical device comprising a first camera and a first processor, the first camera having a first field of view comprising a first area of interest and an overlapping area with a portion of a second field of view of a second camera, wherein the first camera captures a first image of a first portion of the volume of space and wherein the first processor identifies a first plurality of objects in the first image and assigns each of the first plurality of objects to the first area of interest if the object is in the first area of interest or to the overlapping area if the object is in the overlapping area;
   a second electrical device comprising the second camera and a second processor, the second camera having the second field of view, wherein the second field of view comprises a second area of interest and the overlapping area, wherein the second camera captures a second image of a second portion of the volume of space and wherein the second processor identifies a second plurality of objects in the second image and assigns each of the second plurality of objects to the second area of interest if the object is in the second area of interest or to the overlapping area if the object is in the overlapping area; and a controller communicably coupled to the first electrical device and the second electrical device, wherein the controller;

receives an indication of the first plurality of objects located with the first area of interest and an indication of the first plurality of objects located with the overlapping area from the first electrical device;

receives an indication of the second plurality of objects located with the second area of interest and an indication of the second plurality of objects located with the overlapping area from the second electrical device; and determines a total number of objects by summing the first plurality of objects with the second plurality objects and subtracting a total of either the first plurality of objects assigned to the overlapping area or the second plurality of objects assigned to the overlapping area.

2. The system of claim 1, wherein the second electrical device receives a coordinate system from the first electrical device.

3. The system of claim 1, wherein the controller provides the total number of objects to a software reporting tool for maintaining a total of all objects in the volume of space.

4. The system of claim 1, wherein the controller confirms the first and second plurality of objects assigned to the overlapping area are the same objects when a first set of coordinates of the first plurality of objects associated with the overlapping area is within a range of a second set of coordinates of the second plurality of objects associated with the overlapping area.

5. The system of claim 1, wherein the first processor applies an error correction to the first image.

6. The system of claim 1, wherein the first electrical device and the second electrical device are configured so that they are unable to transmit images of the first volume of space and the second volume of space.

7. The system of claim 1, wherein the first electrical device comprises a first transceiver configured to communicate with the controller and the second electrical device comprises a second transceiver configured to communicate with the controller.

8. The system of claim 1, wherein the first electrical device comprises a first light fixture and the second electrical device comprises a second light fixture.

* * * * *